United States Patent [19]

Hattori et al.

[11] Patent Number: 4,715,653
[45] Date of Patent: Dec. 29, 1987

[54] LUMBAR SUPPORT APPARATUS

[75] Inventors: Takemi Hattori, Kariya; Nobuhiko Takeda, Ohbu, both of Japan

[73] Assignee: Aisin Seiki Kabushiki Kaisha, Japan

[21] Appl. No.: 909,129

[22] Filed: Sep. 19, 1986

[30] Foreign Application Priority Data

Sep. 19, 1985 [JP] Japan .................. 60-207262

[51] Int. Cl.$^4$ ................................. A47C 3/00
[52] U.S. Cl. ........................ 297/284; 297/460
[58] Field of Search ................. 297/284, 460

[56] References Cited

U.S. PATENT DOCUMENTS

| | | | |
|---|---|---|---|
| 3,178,221 | 4/1965 | Schwarz | 297/284 |
| 3,241,879 | 3/1966 | Castello et al. | 297/284 |
| 3,378,299 | 4/1968 | Sandor | 297/284 |
| 3,890,000 | 6/1975 | Easley | |
| 4,019,777 | 4/1977 | Hayashi | 297/284 |
| 4,162,807 | 7/1979 | Yoshimura | |
| 4,182,533 | 1/1980 | Arndt et al. | |
| 4,295,681 | 10/1981 | Gregory | |
| 4,296,965 | 10/1981 | Sakurada et al. | |
| 4,309,058 | 1/1982 | Barley | 297/284 |
| 4,449,751 | 5/1984 | Murphy et al. | |
| 4,565,406 | 1/1986 | Suzuki | 297/284 |
| 4,576,410 | 3/1986 | Hattori | |
| 4,588,172 | 5/1986 | Fourrey et al. | 297/284 X |

FOREIGN PATENT DOCUMENTS 2856784 7/1979 Fed. Rep. of Germany ...... 297/284

*Primary Examiner*—Francis K. Zugel
*Attorney, Agent, or Firm*—Finnegan, Henderson, Farabow, Garrett & Dunner

[57] ABSTRACT

A lumbar support apparatus includes a seat frame, a first wire support member fixed to the frame, a second wire support member attached to the frame and a third wire support member interconnecting the first and second support members. The second support member is movable to a position forward of the seat frame. The movement of the three support members by virtue of the interconnections causes a reduction in the discomfort to a seat occupant.

1 Claim, 6 Drawing Figures

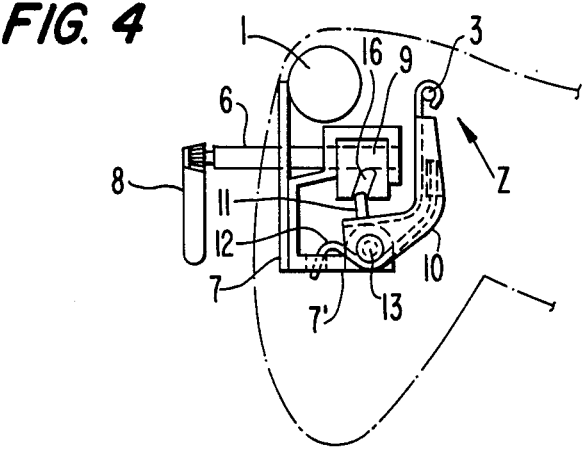
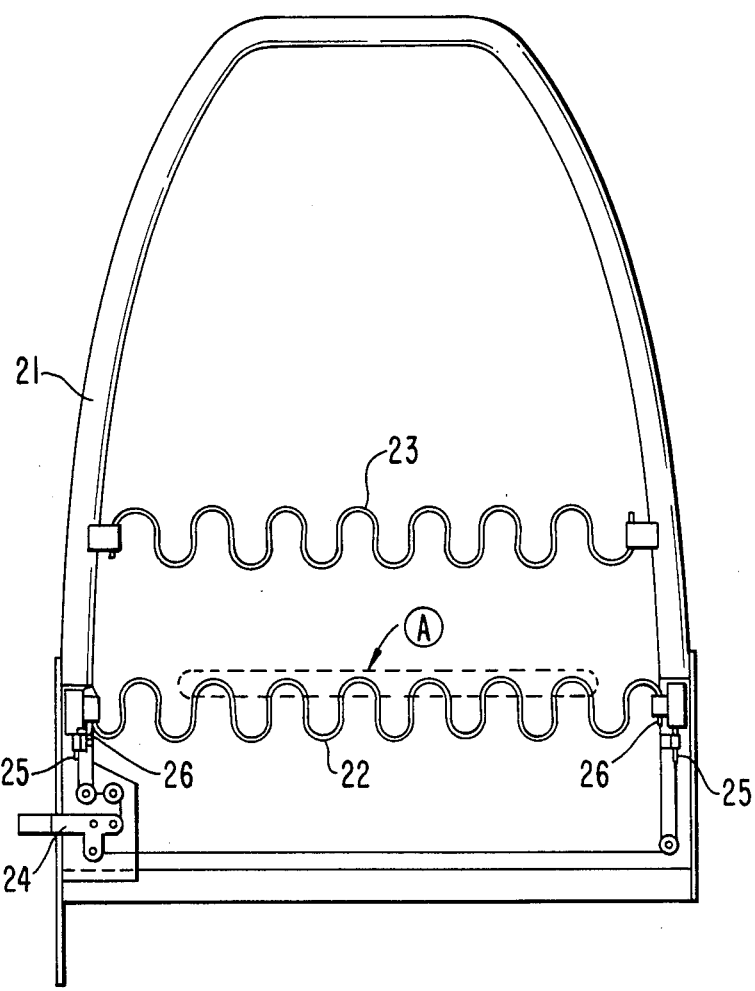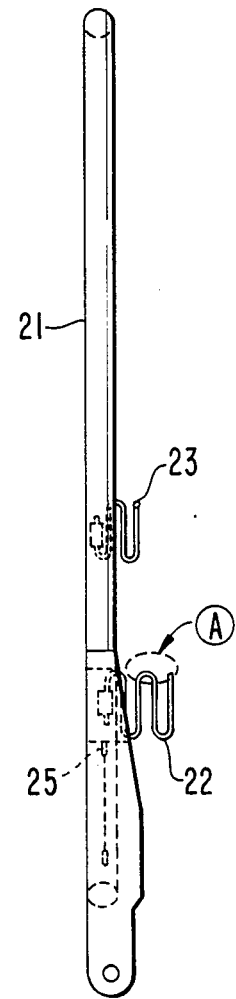

LUMBAR SUPPORT APPARATUS

BACKGROUND OF THE INVENTION

1. Field of the Invention

The present invention relates to a lumbar support apparatus and, more particularly, to a lumbar support for vehicle seats.

2. Description of the Related Art

In a conventional lumbar support apparatus disclosed, for example, in Japanese Patent Publication No. 55 (1980)-14647 and shown in FIGS. 5 and 6 herein, a seat frame 21 is provided with support members 22, 23 made of an elastic material such as wire formed in a sinusoidal pattern to constitute an S-spring. Members 22, 23 support the lumbar portion of the back at the lower portion of the seat frame 21. The seat frame 21 and support members 22, 23 are covered by, for example, vinyl, leather or cloth.

When lever 24 is moved upwardly, lock pins 25 connected to lever 24 are disengaged and slide rails 26, to which the support member 22 is fixed, are movable to permit forward and rearward movement of the support member 22 to thereby adjust the seat back on the seat frame 21. However, when support member 22 is permitted to extend forward of the seat when the lumbar support is operated, the difference between the fronts of support members 22 and 23 may become so large that it creates discomfort to the back of the user approximately along the portion A of the support member 22.

SUMMARY OF THE INVENTION

An object of the present invention is to provide an improved lumbar support apparatus which does not result in discomfort to the back of a driver or passenger when a lumbar support member is positioned forward of other back support members in the back part of the seat in which such person is seated.

Another object of the present invention is to provide an improved lumbar support apparatus which can be reliably moved.

A still further object of this invention is to provide an improved lumbar support apparatus which is relatively simple and includes a minimum number of parts.

Additional objects and advantages of the present invention will be set forth in part in the description that follows and in part will be obvious from the description or may be learned by practice of the invention. The objects and advantages of the invention may be realized and obtained by the apparatus particularly pointed out in the appended claims.

To achieve the objects and in accordance with the purpose of the invention, as embodied and as broadly described herein, a lumbar support apparatus is provided having a seat frame; a first support member fixed to the frame; a second support member fixed to the frame; a second support member attached to the frame, the second support member being movable from substantially within a plane defined by the frame to a position forward of the plane; and a third support member interposed between the first and second support member for integrally interconnecting the same. The first fixed support member, the second movable support member and the third support member are made of an elastic material.

The accompanying drawings, which are incorporated in and constitute a part of this specification, illustrate a presently preferred embodiment of the invention and, together with a description, serve to explain the principles of the invention.

BRIEF DESCRIPTION OF THE DRAWINGS

FIG. 4 is a fragmentary view looking in the direction of the arrow designated as A in FIG. 1;

FIG. 5 is a front view of a conventional lumbar support apparatus; and

FIG. 6 is a side view of the apparatus of FIG. 5.

DETAILED DESCRIPTION OF THE PREFERRED EMBODIMENT

Figure 1:
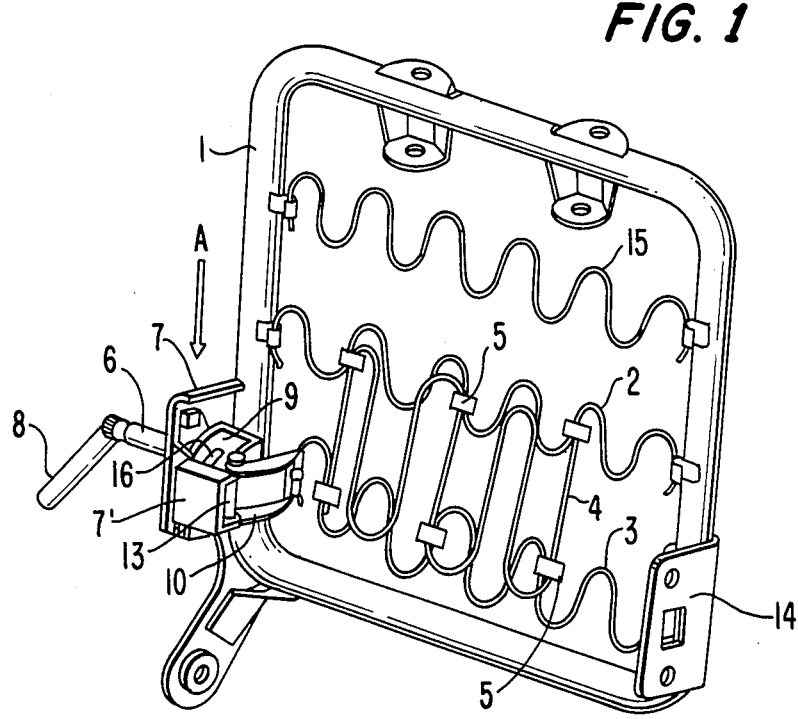
FIG. 1 is a perspective view of a preferred embodiment of a lumbar support apparatus constructed according to the present invention.
Figure 2:
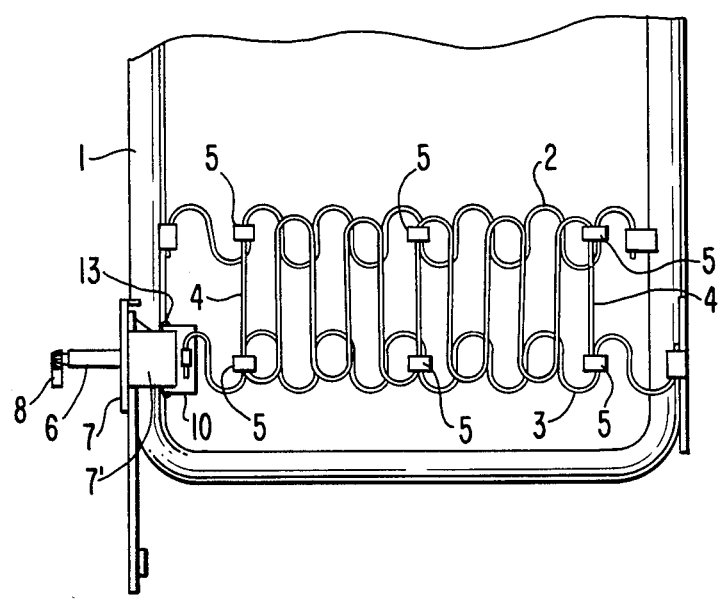
FIG. 2 is a partial front view of the lumbar support apparatus of FIG. 1.

Reference will now be made in detail to a presently preferred embodiment of the invention, an example of which is illustrated in the accompanying drawings. Throughout the drawings, like reference characters are used to designate like elements.

Referring now to FIGS. 1 to 4, upper and lower support members 2, 3, respectively, are mounted on a frame 1. Another support member 4 is interposed between support members 2 and 3 and is connected to support members 2 and 3 at a plurality of points by means of clips 5 that interconnect these latter two members. Support members 2, 3, 4 are preferably made of an elastic material, such as wire, formed into a sinusoidally patterned S-spring or the like. Spring 3 preferably is attached at one end to a bracket 14 mounted on frame 1. Another S-spring support member 15 is shown mounted adjacent to the top of frame 1.

Support bracket 7 is fixed to the frame 1. As shown in FIG. 4, bracket 7 is fixed to the frame and bracket 7' is fixed to bracket 7 and extends inwardly from bracket 7. Axle 6 of an operating lever 8 is supported by bracket 7, and a groove cam 9, i.e., a cam having a groove 16 thereon, is mounted on one end of the axle 6. An arm 10 is pivotably supported at one end on axle 13 by the bracket 7'. Arm 10 is biased by a torsion spring 12 in the direction indicated by the arrow Z. Support member 3 is attached to the other end of arm 10. A cam pin 11 is connected to arm 10 so as to engage the groove 16 of groove cam 9. Frame 1, bracket 7, arm 10 and cam 9 are encased within a seat cover shown as a broken line in FIG. 4.

As described, the groove cam 9 is rotated by the axle 6 when lever 8 is rotated. Cam pin 11, which is engaged by the cam groove 16, is moved in accordance with the change in position of the groove when the cam 9 is rotated. Arm 10, which is acted upon by the cam pin 11, is rotated around the axle 13 by the movement of the cam pin 11, either by or against the bias of torsion spring 12 depending on the direction of rotation of arm 10, so that the support member 3 is forwardly and rearwardly moved. When arm 10 is rotated in a counterclockwise direction with respect to FIG. 4, the support member 3 is moved to a backward position.

Figure 3:
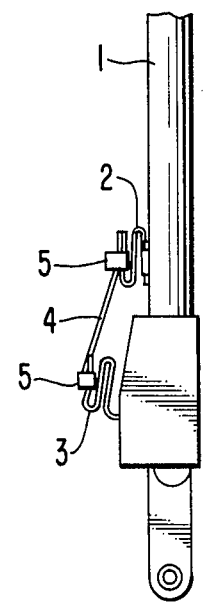
FIG. 3 is a side view of the apparatus of FIG. 2.

When arm 10 is rotated in a clockwise direction, the support member 3 extends outwardly in the front direction of the seat, as shown in FIG. 3; however, a user does not feel discomfort because support members 3 and 2 are connected together by the support member 4. When support 3 extends forwardly, support member 4 is also pulled forward. The shape of support members 2, 3, 4 in FIG. 1 is thus simplified.

The construction of the above embodiment can be accomplished by connecting the support member 4 to support members 2, 3 by clips 5 after assemblying the various parts of the lumbar support apparatus. Thus, there is no need for changing the general shape of a conventional lumbar support apparatus. Further, by having the support members 2, 3, 4 interconnected, moderate overall seat stiffness and stability are obtained.

By the foregoing, there has been disclosed a preferred embodiment of a lumbar support apparatus constructed in accordance with the present invention. It will be appreciated that various additions, substitutions, modifications and omissions may be made thereto without departing from the spirit of the invention. The invention in its broader aspects is, therefore, not limited to the specific details, representative apparatus, and illustrative examples shown and described above. Thus, it is intended that all matter contained in the foregoing description or shown in the accompanying drawings shall be interpreted as illustrative and not in a limiting sense.

What is claimed is:

1. A lumbar support apparatus comprising:
    a seat frame;
    a first support member fixed to said frame, said first support member being made of wire formed in an S-spring;
    a second support member attached to said frame, said second support member being made of wire formed in an S-spring and being movable from substantially within a plane defined by said frame to a position forward of said plane;
    a third support member interposed between said first and second support members for interconnecting the same and movable with said second support member, said third support member being made of wire formed in an S-spring and connected to said first fixed support member and said second movable support member at a plurality of points; and
    a cam mounted for rotation on said frame, said cam having a groove formed thereon;
    a movable arm connected to said second support member; and
    a cam pin connected to said movable arm and engaging said groove so as to cause movement of said arm upon rotation of said cam, thereby moving said second support member and the interconnected first and third support members.

* * * * *